(12) United States Patent
Miller

(10) Patent No.: US 10,019,055 B2
(45) Date of Patent: Jul. 10, 2018

(54) PROXIMITY AWARE CONTENT SWITCHING USER INTERFACE

(71) Applicant: Siemens Healthcare Diagnostics Inc., Tarrytown, NY (US)

(72) Inventor: Kerry Miller, Elkton, MD (US)

(73) Assignee: Siemens Healthcare Diagnostic Inc., Tarrytown, NY (US)

( * ) Notice: Subject to any disclaimer, the term of this patent is extended or adjusted under 35 U.S.C. 154(b) by 57 days.

(21) Appl. No.: 15/029,764

(22) PCT Filed: Oct. 29, 2014

(86) PCT No.: PCT/US2014/062787
§ 371 (c)(1),
(2) Date: Apr. 15, 2016

(87) PCT Pub. No.: WO2015/069503
PCT Pub. Date: May 14, 2015

(65) Prior Publication Data
US 2016/0246364 A1 Aug. 25, 2016

Related U.S. Application Data

(60) Provisional application No. 61/901,606, filed on Nov. 8, 2013.

(51) Int. Cl.
*G06F 3/01* (2006.01)
*G09G 5/00* (2006.01)
(Continued)

(52) U.S. Cl.
CPC ......... *G06F 3/012* (2013.01); *G06K 9/00255* (2013.01); *G09G 5/00* (2013.01);
(Continued)

(58) Field of Classification Search
CPC .. G09G 5/373; G09G 2320/0261; G09G 5/00; G09G 5/003; G09G 2358/00;
(Continued)

(56) References Cited

U.S. PATENT DOCUMENTS 6,002,427 A 12/1999 Kipust
6,971,072 B1 11/2005 Stein
(Continued)

OTHER PUBLICATIONS

International Search Report for PCT/US2014/062787 dated Feb. 19, 2015.

*Primary Examiner* — Abhishek Sarma

(57) ABSTRACT

A distance between a user and a user interface is detected to permit modification of the user interface to accommodate the user being located some distance from the user interface. A sensor detects a distance of the user from the user interface. The detected distance can be used to modify a display or presentation provided by the user interface so that the user can more easily interact with the user interface at a distance. The scope of user interaction with the user interface can also be made contingent upon the distance between a user and the user interface. Further, context modulation with user distance can result in an automatic change in the class of information displayed. The changes to the user interface output can be configured in accordance with a profile that may include priority for user interface items as well as customization for an environment or particular user.

24 Claims, 7 Drawing Sheets

(51) Int. Cl.
*G06K 9/00* (2006.01)
*G09G 5/373* (2006.01)

(52) U.S. Cl.
CPC ............. *G09G 5/003* (2013.01); *G09G 5/373* (2013.01); *G09G 2320/0261* (2013.01); *G09G 2340/04* (2013.01); *G09G 2340/14* (2013.01); *G09G 2354/00* (2013.01); *G09G 2358/00* (2013.01)

(58) Field of Classification Search
CPC ........... G09G 2354/00; G09G 2340/04; G09G 2340/14; G06K 9/00255; G06F 3/012
See application file for complete search history.

(56) References Cited

U.S. PATENT DOCUMENTS

| | | |
|---|---|---|
| 7,203,911 B2 | 4/2007 | Williams |
| 2003/0122777 A1 | 7/2003 | Grover |
| 2009/0079765 A1 | 3/2009 | Hoover |
| 2009/0164896 A1 | 6/2009 | Thorn |
| 2010/0073285 A1 | 3/2010 | Bertsch |
| 2011/0157233 A1 | 6/2011 | Kitagawa |
| 2012/0287163 A1 | 11/2012 | Djavaherian |
| 2012/0327099 A1 | 12/2012 | Vojak |
| 2016/0034050 A1* | 2/2016 | Ady .................... G06F 1/3231 345/619 |

* cited by examiner

PROXIMITY AWARE CONTENT SWITCHING USER INTERFACE

STATEMENT REGARDING FEDERALLY SPONSORED RESEARCH OR DEVELOPMENT

N/A

BACKGROUND

User interface design is typically undertaken with the assumption that a user is in close proximity to the equipment on which the user interface is implemented. For example, a user interface design for a desktop computer may be based on the assumption that the user will be seated in front of a display that provides output to the user, and also that the user is in close proximity to input devices, such as a keyboard or a mouse. Accordingly, the display of a typical user interface has a degree of granularity and detail that presumes the user is in fairly close proximity with the display.

In some computer environments, the presumption that a user is located in proximity with a user interface console is not always valid. For example, in a laboratory environment that includes a number of instruments or systems that are interconnected and may use a common, central console, a user may be tasked with actions that take place at the various instruments or systems. In interacting with the different instruments or systems, the operator/user may seek to refer back to the display of the central console to determine a status of an instrument or system including one at which they are conducting activities. However, due to the typical presumptions of user interface design, a user located at some distance from the central console cannot easily determine details of the display, or status of the instrument or system provided at the central console. Devices employed for interfacing with a central console when proximate a display may be different than those required for interfacing at a distance. Display content provided when a user is proximate the central console may not be appropriate when a user is distant from the display.

SUMMARY

A user interface includes a proximity sensor for determining a distance of a user from the user interface. The user interface is modified with regard to at least the output or display, in accordance with a distance determined between the user and the user interface. When the user is detected to be at a relatively large distance from the user interface, the display is changed to show information with lesser granularity and/or detail so as to be easily observed from a distance at which the user is located from the user interface. The content and layout of the user interface display can be modified based on the detected distance between the user and the user interface, and can be dynamically modified as the distance changes. For example, the resolution, display information density, font size, icon size, color, image size, and any other display component or attribute can be modified to permit adjustments to distance for viewing by the user.

According to one aspect, a text size may be increased and expanded to cover a greater region of the display as the detected distance between the user and user interface increases. A threshold can be set and used to prevent the display of text in favor of other components that may more easily convey information to a user at a distance. According to one aspect, the available bandwidth for displaying information that can be viewed by a user is inversely proportional to the distance of the user from the user interface. Accordingly, as the user retreats from the user interface, the available viewing bandwidth decreases, and when the user approaches the user interface, the available bandwidth increases.

In some instances, display information may be prioritized for viewing at a distance, so that some display items may be removed from the display when they are assigned a lower priority than other, higher priority items that may be continued to be displayed, or may be expanded within the display. As a distance between a user and user interface decreases, lower priority display items may be redisplayed or promoted/expanded within the display, while higher priority display items are reduced in prominence.

In addition to implementing a change in content and/or layout with detected user distance, the user interface can also be configured to provide a change in the scope of interaction available to the user as user distance varies. For example, with a range of distances that are relatively close to the user interface, interaction through one or more of an associated keyboard, mouse, and touch screen are enabled. At a further range of distances, interaction is only enabled through an interface such as a microphone and voice command recognition software and/or optical sensors and motion recognition software. Within this second range of distances, user input devices such as the keyboard, mouse and touch screen are disabled. At yet a further range of distances, no user interaction may be implementable. Thus, the scope of interaction changes with user distance.

Further, the context provided by the user interface itself can be changed or modified depending upon detected user distance. For many known systems, context can change between two states as a function of time, which can also be referred to as inactivity. These states are the active display content, on the one hand, and inactive display content, on the other hand. The inactive display content may be a blank screen used to minimize damage to the physical display unit. The inactive display content may also be a display screen requiring a password or other security credential to return to the active display.

With the presently disclosed user interface, context can be dependent upon detected user presence or distance/absence. As an example, when a user viewing or interacting with a display comprised of sensitive or restricted information is detected as moving away from the user interface, the context may be immediately changed, whereby the display is made blank, locked, or changed to display non-sensitive information such as the status of an associated system. Thus, context is altered based upon perceived user distance rather than time or inactivity.

In another example of context modulation based upon user distance, a user may be viewing Quality Control (QC) data on the user interface. When the user is detected walking away, the user interface can be configured to revert to a general system status display or to a blank screen. When a user is again detected within a relatively close range of distances, the display can automatically return to the previously viewed QC data. Such may not be the case if a user had been previously viewing sensitive or restricted information, in which case the user interface may not automatically return to the previously viewed information, instead requiring the input or presentation of a given security credential or credentials. Thus, the ability to modulate the display context can be dependent upon the context itself.

According to an aspect of the present disclosure, an image capture device, such as a camera or video camcorder is used to detect a distance of a user from the user interface. Images of the user can be captured with the image capture device and analyzed to determine a distance of the user from the image capture device, and thus the user interface. Other types of relatively inexpensive sensors can be used, including motion detection sensors typically found in lighting controls and/or surveillance systems. In addition, an array of sensors can be used, including an array of image capture devices, motion detectors or range detectors. For example, ultrasonic range detectors are available in a variety of sensitivities and price points for various range sensing applications.

An image capture device can also be used to capture images of a user's face, which images can then be analyzed to determine distance from the image capture device, as well as whether the user is looking at the user interface. Detection of the size of the face in the image may also be used for distance detection. An image capture device can also be used to capture images to detect motion to thereby determine distance from the image capture device.

BRIEF DESCRIPTION OF THE SEVERAL VIEWS OF THE DRAWINGS

The present disclosure is described in greater detail below, with reference to the accompanying drawings, in which.

DETAILED DESCRIPTION

Figure 1:
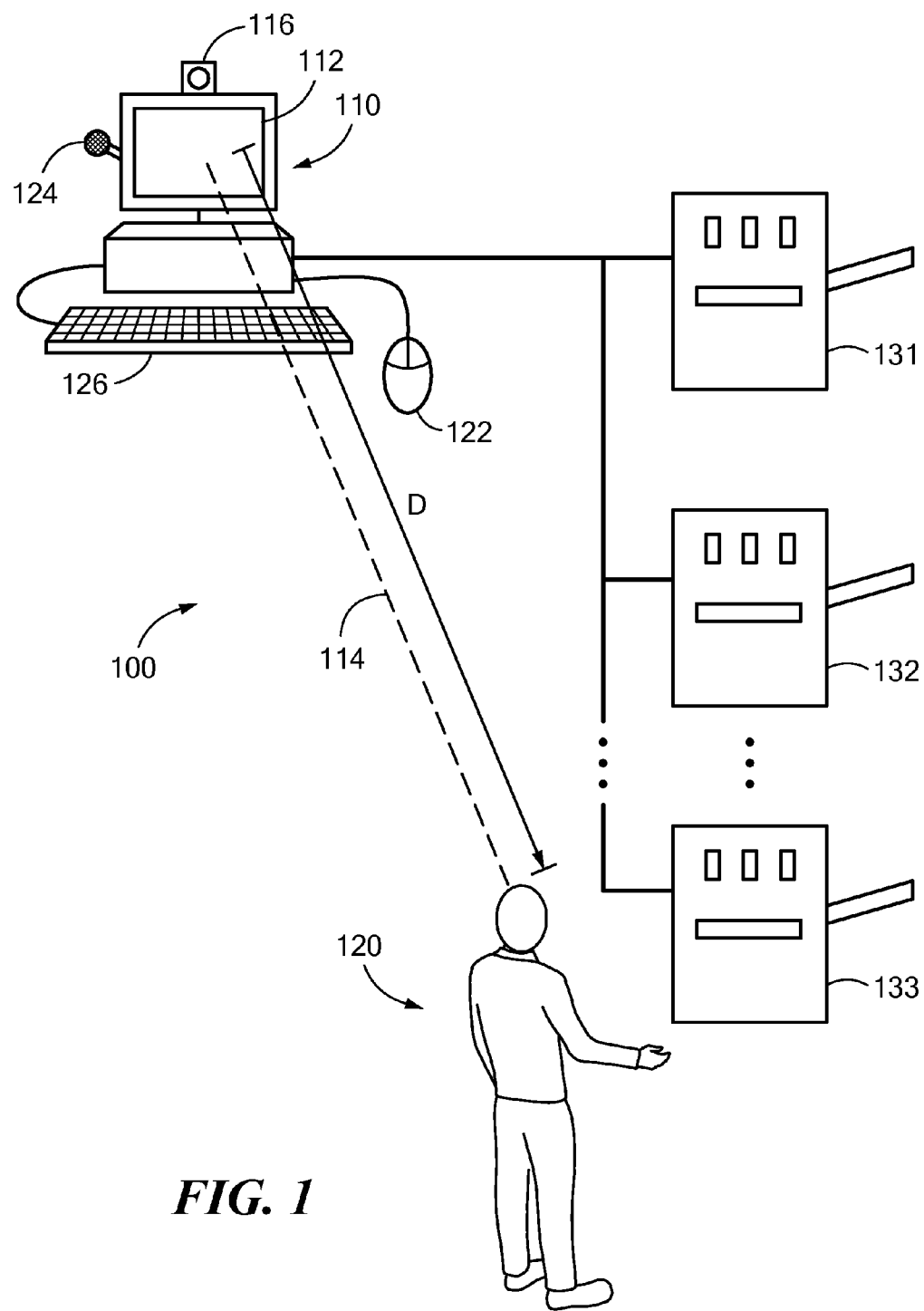
FIG. 1 is a diagram illustrating a laboratory environment with a user positioned at a distance from a user interface.

The present application claims benefit of U.S. Provisional Application No. 61/901,606, filed Nov. 8, 2013, the entire disclosure of which is hereby incorporated herein by reference.

The distance of a user from a user interface is detected to permit the user interface to adapt to provide useful information to the user when the user is separated from the user interface by a greater than a predetermined distance, to enable distance-appropriate interaction, and to provide content-sensitive context modulation dependent upon user distance. The user interface can be adapted to promote or enlarge certain aspects of the display that may be useful to the user when separated by a relatively significant distance from the user interface, e.g. across a room. A sensor is provided to detect the distance of the user from the user interface, and the detected distance is used to determine whether and/or how the user interface should be modified. Modifications to the user interface may be determined according to ranges of distances. For example, a first range may extend from zero to one meter from the user interface, a second range may extend from one meter to five meters, etc. The presently disclosed user interface thus need not measure an exact distance to a user but rather may only detect which distance range a user is in and whether a user has crossed a distance range threshold. Thus, references to detected distance herein can also be interpreted as detected distance range.

In particular, outputs from the user interface may be modified in accordance with the detected distance. Components of the display may be enlarged, diminished, highlighted, made more or less prominent, or subject to any other modification that helps to promote easier interaction with the user at the detected distance. Other types of outputs can be similarly adapted, such as modifying the volume of an audio output based on the detected distance, providing or discontinuing an audio signal, changing resolution of an image or video display, switching a display on or off or any other kind of output modification available in a typical user interface. The user proximity detecting can also be selectively enabled or disabled.

Likewise, inputs to the user interface may be selectively enabled depending upon detected user distance. This concept may also be viewed as selectively altering the scope of user interaction with user distance. User input devices such as a keyboard, mouse or touch screen display may be enabled when a user is detected proximate to the user interface. However, a microphone and voice command software may be utilized for user interaction when the user is detected at a more distant position.

The display context of the user interface may also be varied with detected user distance, a capability referred to as context modulation with distance. An initial display may be provided as long as a user is detected proximate to the user interface or within a given distance range. When the user is detected beyond or outside of this distance, the user interface is configured to automatically change. This changed display may be to a blank screen, a lock screen requiring a password or other security credential, or some other display screen. The user interface may also be configured to return to the initial display when the user is next detected to be proximate to the user interface or within the given distance range. Alternatively, if the initially displayed information was comprised of sensitive or restricted information, the user interface may also be configured to provide a display comprised of non-restricted data or the lock screen upon next detection of the user at close range; in this embodiment, any return to a display comprised of sensitive or restricted information must be user initiated and may require entry or presentation of a security credential or credentials.

Referring now to FIG. 1, an illustration of a computing environment 100 with a number of interconnected devices is illustrated. A central console 110 comprising in part a computer controller and associated memory 140 provides a user interface for user 120 to interact with various devices 131-133. As illustrated in FIG. 1, user 120 is located at a distance D from a display 112 of console 110. User 120 has a line of sight view 114 of display 112, and is also within earshot of an audio output (not shown) of console 110. In computing environment 100, user 120 may be tasked with attending to devices 131-133, which may include providing items to any one of devices 131-133, or checking operation or responding to alarms or messages generated by any of devices 131-133. Accordingly, user 120 may sometimes be located a distance D from console 110, and may desire to interact with console 110. For example, operations that user 120 conducts on devices 131-133 may cause a display change for display 112. The display may also be referred to more generically as one type of presentation device. As another example, user 120 may be attending to device 133, when device 131 annunciates an alarm that demands urgent attention, with the alarm being annunciated on display 112 of console 110. Accordingly, user 120 preferably continues to interact with console 110 even though separated by distance D from console 110.

Console 110 includes a sensor 116 that can detect distance between user 120 and console 110. The sensor may also be referred to as a distance measurement unit. More particularly, sensor 116 can determine a distance from its location to user 120 using any of various detection techniques. For example, sensor 116 can be implemented as an image capture device, such as a camera or a video camcorder and can capture an image of user 120. The captured image of user 120 can be compared against a nominal background in the absence of user 120, to obtain a differential image measure that can be used to determine distance to user 120.

Other types of sensors that can be used to implement sensor 116 include motion detection sensors that operate based on ultrasonic or optical principles. Other sensors, such as those that operate on bases such as radio frequency telemetry, such as radar, optical telemetry, such as lidar, or other range detection techniques involving analysis of a previously transmitted signal that is returned to sensor 116 as modified with the presence of user 120. Motion detection may also be used to detect distance, since user 120 is likely to be in motion while attending to device 133, for example, and at least provides a modified environment from that of a nominal or base line environment. In the case of an image capture device, motion detection can be achieved by identifying pixels that change or indicate motion in one or more images. A boundary enclosing the identified pixels showing motion can be used to estimate distance. The boundary, which can be provided in the shape of a rectangle, may then be used with various thresholds for size to detect distance. For example, as the size of the boundary bordered shape increases, distance D is determined to decrease. The various thresholds for the size of the bordered pixel area can be calibrated to indicate specific distances with regard to the detected motion of user 120.

Floor-mounted sensors may also be employed in further embodiments. For example, sensors that are responsive to changes in weight or load may provide an indication of the presence of an operator in various locations within a workspace. Alternatively, inductive or resistive sensors under a floor surface may also be employed. Perimeter-mounted arrays of optical transmitter-receiver pairs may also be utilized, where interference of light transmission may be used to infer operator position within an area.

The image capture device may also be used to detect a face in a captured image to contribute to determining distance D. The size of a detected face can be determined and used to judge distance D. Various thresholds for face size can be used to determine distance, which thresholds can be calibrated for specific distance or specific users 120. As sensor 116 operates to detect distance D, an output of console 110 can be modified in accordance with a profile established for response to a given distance being detected.

When the user is perceived as being proximate to the central console 110 providing the user interface, interaction mechanisms such as a keyboard 126, mouse 122 and touch screen capability integrated into the display 112 may be enabled. However, when a user is detected as having moved to a more distant location from the user interface of the central console 110, different interaction mechanisms such as a microphone 124 and voice command software executed by the central console and/or optical sensor(s), such as sensor 116, and motion recognition software executed by the control console are enabled. Further still, when a user is detected as having moved to a greater distance, or out of detectable range altogether, no interaction mechanisms may be enabled.

Figure 2:
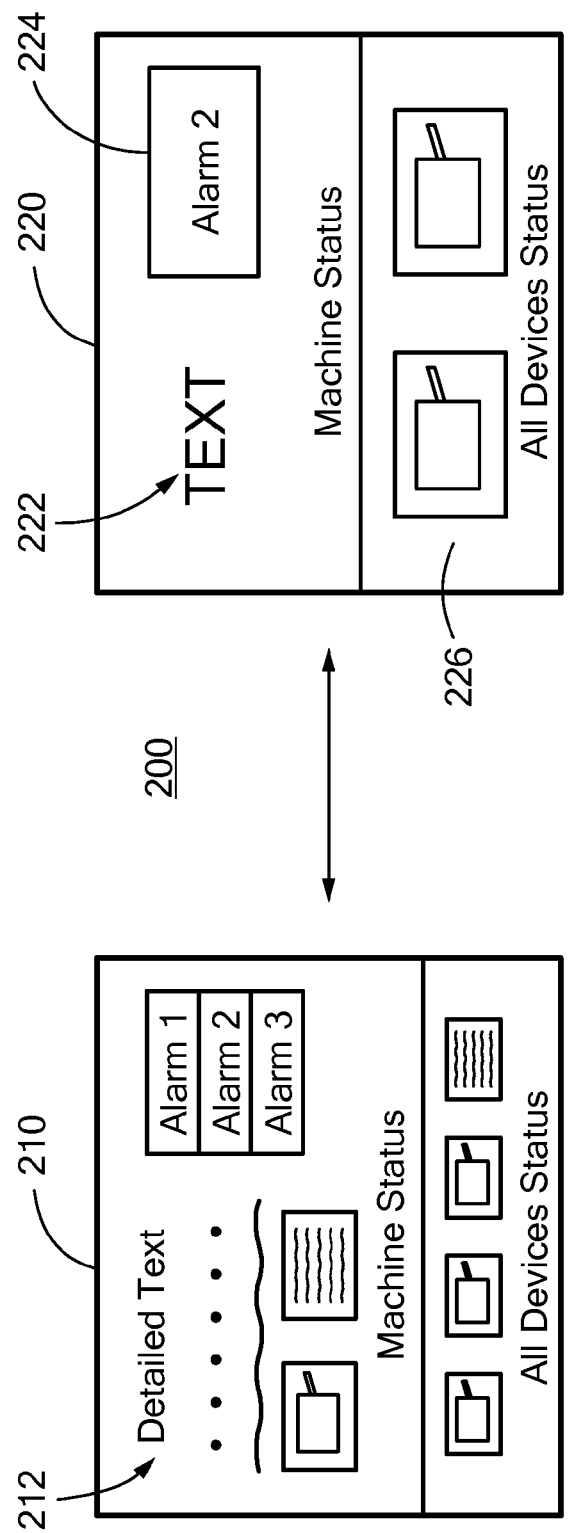
FIG. 2 is a diagram illustrating a transition between user interface outputs with respect to changing distance of a user from a user interface.

Referring now to FIG. 2, a display content change 200 in accordance with an exemplary embodiment of the present disclosure is illustrated. Display change 200 provides a display 210 for a user detected to be in close proximity with console 110 and display 220 for a user being located distance D from console 110. Display 210 provides detailed text and numerous alarms and status indications to provide the close proximity user with a relatively significant amount of information for attending to devices 131-133. Display 220 provides enlarged text 222, and singles out a particular alarm 224 for enlargement on display 112, for example. In addition, display 220 may provide an enlarged view of the status of devices 131-133, which enlarged display 226 may be caused to scroll to periodically display the status of all devices 131-133 if not all can fit within the display area.

View change 200 can be configured in accordance with the present disclosure so that detailed text 212 is increased in size or prominence, such as by changing a font size or a resolution to arrive at display 220. Also, components of display 210 can be selectively removed so that display 220 provides higher priority items and does not display lower priority items. The priority of various display items can be ranked in accordance with user preferences, which can be configured in a detection/response profile (not shown), accessible by the central console such as within an associated memory, that indicates how view change 200 should be achieved. Various other changes to transition display 210 to display 220 and back can be provided including changing colors of items, causing items to repeatedly blink on and off, changing size and/or position of display items and other types of visual modifications that can promote or diminish the viewability or importance of a display item or items.

In a further embodiment of the presently disclosed systems and methods, one or more sensors capable of detecting the level of ambient light provide input to the console 110. In response to the measured input, the console 110 may adjust the brightness of the image on the display 112, both with a user at the same distance range or as a function of user distance.

The rate at which the display content is adjusted in accordance with detected user distance is also programmable. It is preferred for the display to not change too rapidly in response to detected distance change. Otherwise, a slight movement of a user could result in frequent changes to the size and content of the display, making it difficult for a user to interpret the display. The rate at which the display is modified can be optimized by the user.

In addition to visual displays, console 110 can provide various presentation devices such as audio outputs that can be modified in accordance with the detected distance. For example, volume can be adjusted to increase with greater distance and decrease with lesser distance. Frequencies for alarms or other audio indications can be modified or turned on or off in dependence on the detected distance. Other devices (not shown) may also be activated or modified with proximity to user 120 such as user interfaces that are in close proximity to devices 131-133. In addition, more generalized annunciators can be used to inform the user 120 of a status of the console 110, such as flashing lights or audio signals that can be observed from anywhere within environment 100. In a further embodiment, the console 110 is provided with one or more sensors for detecting the level of ambient noise, and the console is capable of adjusting the volume of an audio alarm or other indication in response thereto.

The displays provided to user 120 at distance D can be customized in accordance with distance, individual user, or any other useful factor that permits user 120 to continue to interact with console 110 at distance D. Other responses and/or presentations discussed above can similarly be customized for a user 120 or environment 100.

Figure 3:
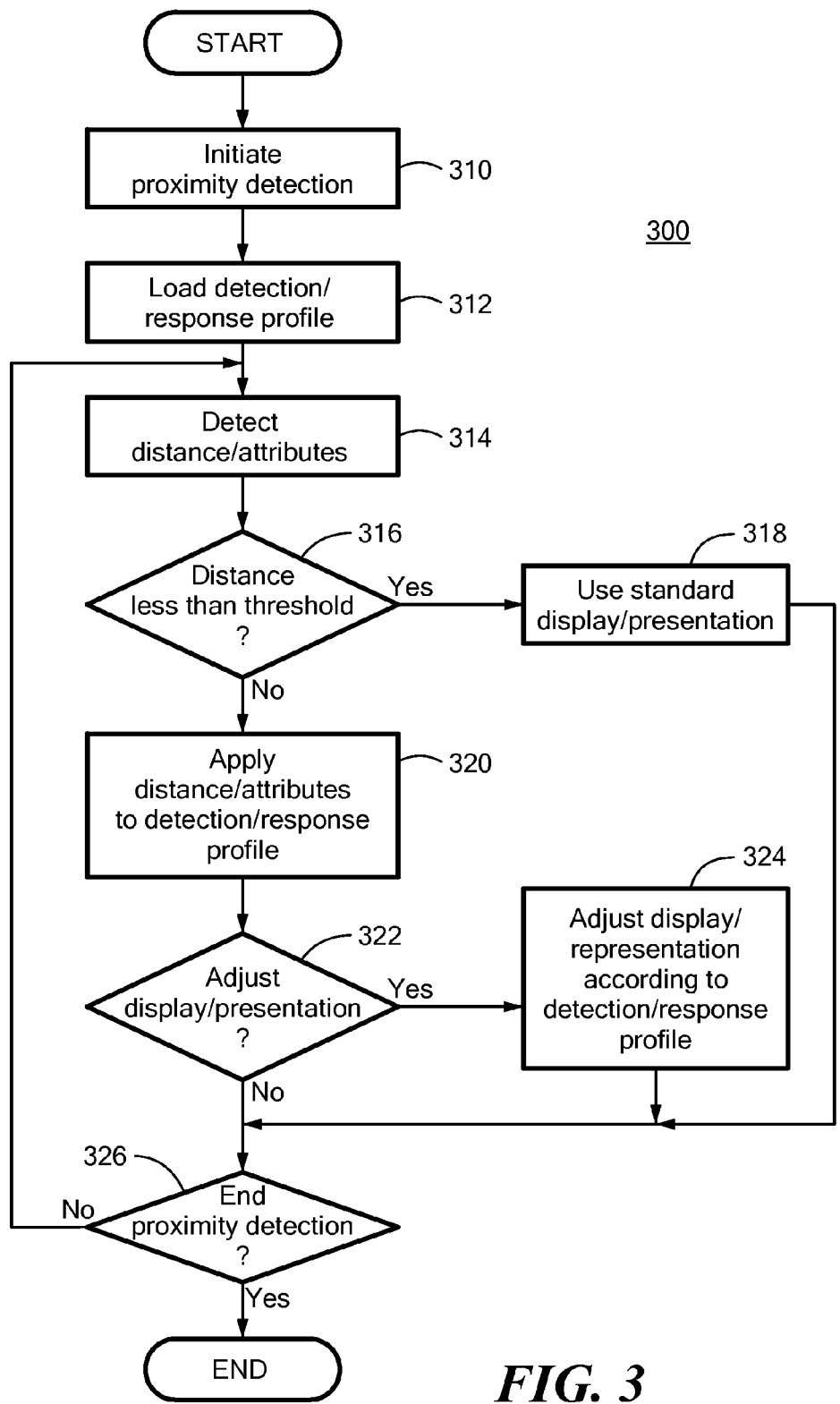
FIG. 3 is a flow chart illustrating a process for detecting distance of a user from a user interface and applying appropriate user interface output adjustments.

Referring now to FIG. 3, a flow chart 300 illustrates a process for response to a change in distance between a user and a user interface. The process begins with the initiation of proximity detection, as illustrated in a block 310. The proximity detection can be turned on or off by the user or the system on which it is employed, and when turned on loads a detection/response profile stored in association with the console, as illustrated in a block 312. The detection/response profile can be configured for a particular user, a particular environment, or for use with a particular distance detection device or sensor. The profile can also be used to configure how a user interface should respond to various detected distances or ranges of distances between a user and a user interface. For example, various display items can be assigned a priority that causes higher priority items to be promoted in a display when the user is at or beyond a specified distance from the display. The profile may also specify the different sizes of display items in dependence upon detected distance between the user and the user interface. Any type of configuration for interaction between the user and user interface in relation to detected distance can be implemented in the profile, which is loaded once the proximity detection process is active.

As the proximity detection process becomes active, distance/attributes of a user with respect to a user interface is detected, as illustrated in a block 314. The distance/attributes detected can be in accordance with the above described sensing techniques, including face detection and motion detection. For example, the detection of a user's face can be used to determine that the user is looking at the user interface, which determination can be used to modify an output of the user interface.

A determination of whether the user is located at or proximate the user interface can be made, as illustrated with decision block 316. If the detected distance is less than a specified threshold that indicates that the user is located at the user interface, a standard display presentation can be used for the user interface, as illustrated with the "yes" branch taken from decision block 316 to a block 318. If it is determined that the distance is greater than a threshold value, indicating that the user is not located at or proximate the user interface, further processing can be undertaken, as indicated with the "no" branch from decision block 316.

As part of the further processing, the detected distance, distance range, and/or attributes can be applied to the detection/response profile as illustrated in a block 320. The distance or attributes applied to the profile produce a presentation response for the detected distance, distance range, and/or attributes in accordance with the profile. A determination of whether to adjust the display/presentation is made, as illustrated in a decision block 322. The "yes" branch of decision block 322 indicates an adjustment decision being made, whereupon the display/presentation is adjusted in accordance with the detection response profile, as illustrated in block 324. If no adjustment to the display/presentation is needed based on the measured distance, distance range and/or attributes, no adjustment to the display is made, as illustrated with the "no" branch of decision block 322.

Following potential adjustment of the display/presentation, a determination is made as to whether proximity detection should be terminated as illustrated in decision block 326. If proximity detection is not commanded to end, the process illustrated in flowchart 300 continues with the detection of distance, distance range, and/or attributes, as illustrated with the "no" branch of decision block 326 returning to block 314. If proximity detection is to be terminated, the process illustrated in flowchart 300 ends as illustrated with the "yes" branch of decision block 326.

Figure 4:
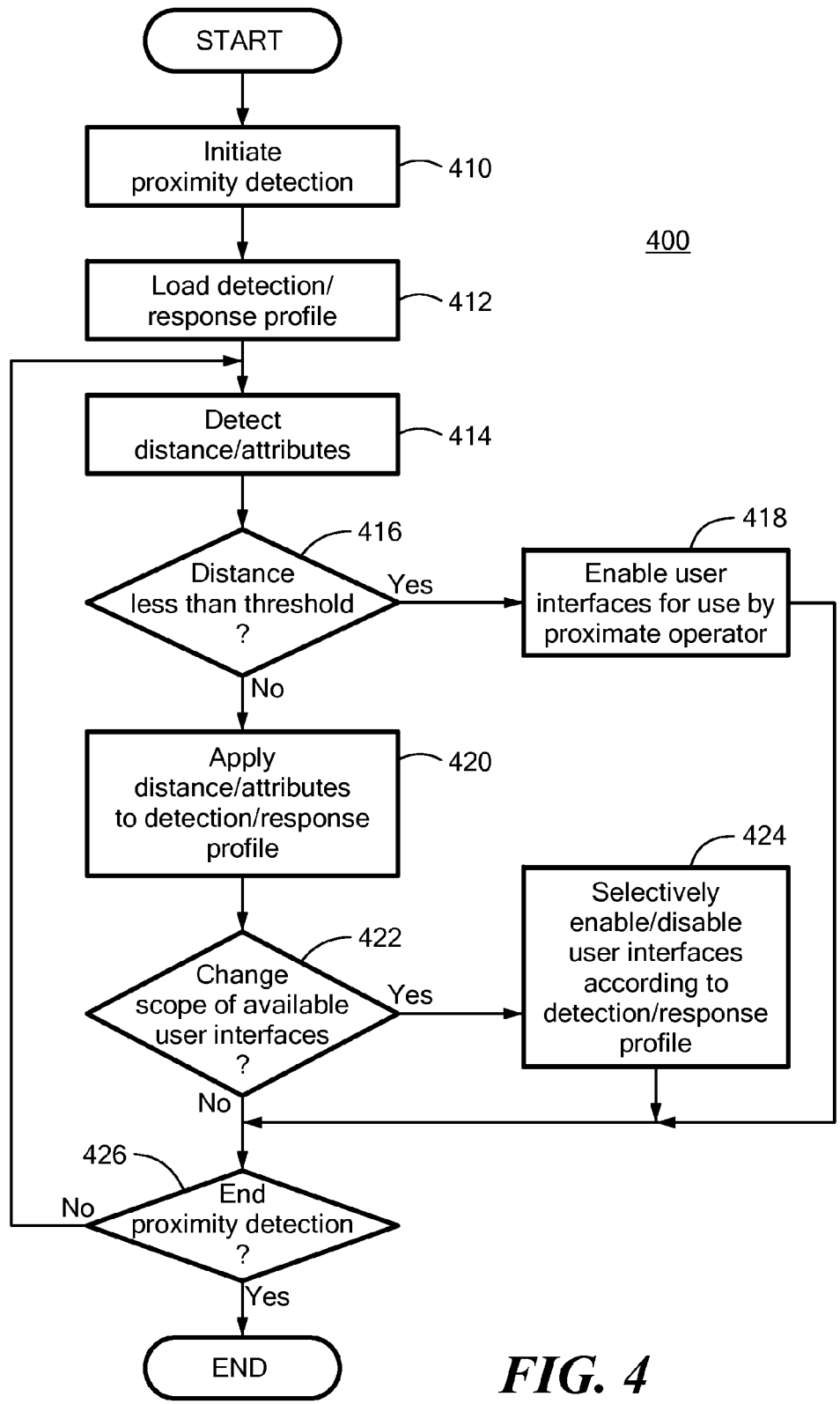
FIG. 4 is a flow chart illustrating a process for detecting distance of a user from a user interface and changing the scope of user interactions with distance.

Referring now to FIG. 4, a flow chart 400 illustrates a process for adjusting the scope of interaction enabled at the user interface with detected user distance. The process begins with the initiation of proximity detection, as illustrated in block 410. The proximity detection can be turned on or off by the user or the system on which it is employed, and when turned on loads a detection/response profile stored in association with the console, as illustrated in a block 412. The detection/response profile can be configured for a particular user, a particular environment, or for use with a particular distance detection device or sensor. The profile can also be used to configure how a user interface should respond to various detected distances or ranges of distances between a user and a user interface. For example, various interaction mechanisms like a keyboard and mouse can be activated when the user is proximate the central console, while some or all of those interaction mechanisms may be of no use when the user is at or beyond a specified distance from the display. In the latter case, alternate interaction mechanisms are enabled, such as an optical detector and motion recognition software executed by the console or a microphone and voice recognition software executed by the console are enabled instead. Any type of configuration for interaction between the user and user interface in relation to detected distance can be implemented in the profile, which is loaded once the proximity detection process is active.

As the proximity detection process becomes active, distance/attributes of a user with respect to a user interface is detected, as illustrated in a block 414. The distance/attributes detected can be in accordance with the above described sensing techniques, including face detection and motion detection.

A determination of whether the user is located at or proximate the user interface can be made, as illustrated with decision block 416. If the detected distance is less than a specified threshold that indicates that the user is located at or proximate the user interface, user interface mechanisms/devices usable or useful to a user proximate the user interface are enabled, as illustrated with the "yes" branch taken from decision block 416 to block 418. If it is determined that the user distance is greater than a threshold distance value, indicating the user is not located at or proximate the user interface, further processing can be undertaken, as indicated with the "no" branch from decision block 416.

As part of the further processing, the detected distance/attributes can be applied to the detection/response profile as illustrated in block 420. The distance, distance range, or attributes applied to the profile produce a change in user interface scope for the detected distance, range of distances, or attributes in accordance with the profile. A determination of whether to selectively enable/disable user interfaces according to the detection/response profile is made, as illustrated in decision block 422. The "yes" branch of decision block 422 indicates a change in which user interfaces are enabled or disabled in accordance with the detection response profile, as illustrated in block 424. If no change in which user interfaces is needed based on the measured distance, distance range, and/or attributes, no change in the user interfaces is made, as illustrated with the "no" branch of decision block 422.

Following potential adjustment of which user interface mechanisms are enabled and which are not, a determination is made as to whether proximity detection should be terminated, as illustrated in decision block 426. If proximity detection is not commanded to end, the process illustrated in flowchart 400 continues with the detection of distance, distance range, and/or attributes, as illustrated with the "no" branch of decision block 426 returning to block 414. If proximity detection is to be terminated, the process illustrated in flowchart 400 ends as illustrated with the "yes" branch of decision block 426.

Figure 5A:
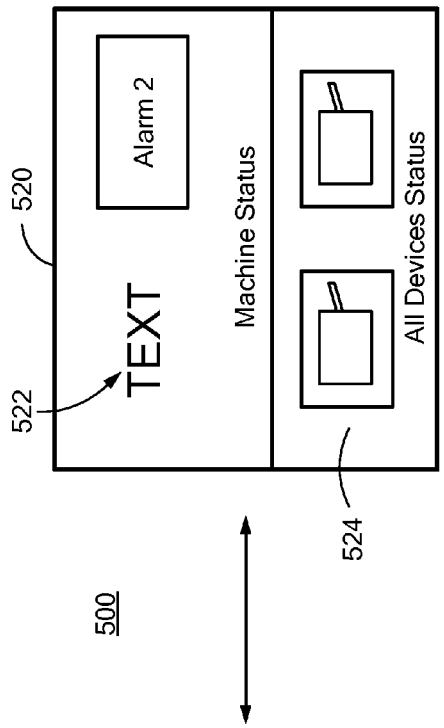
FIG. 5A is a diagram illustrating a transition between display data of one context and display data of another context with respect to changing distance of a user from a user interface.

Referring now to FIG. 5A, display context modulation 500 in accordance with an exemplary embodiment of the present disclosure is illustrated. Display context change 500 provides a display 510 for a user detected to be in close proximity with the console 110, and a different display 520 for a user detected to be at a distance equal to or beyond a predetermined threshold distance. Display 510 provides, in this example, quality control data to a user, such as for the purpose of monitoring the historical performance of various devices 131-133. However, as a user moves further away from the user interface, such performance or quality control data may be less useful. Instead, a distant user, detected to be proximate a particular instrument, may be more concerned with the status 522 of that instrument, as well as the status 524 of the adjacent equipment as well. Thus, rather than simply changing the content (e.g., size, depth of information) on a display when a user is detected to be farther away, the user interface may be configured, according to a pre-programmed response profile, to change or modulate the context of the display.

In FIG. 5A, the display context change is illustrated as being bidirectional, reflecting the ability for the presently disclosed system and method, in one embodiment, to automatically switch from a first display context, appropriate for when a user is close to the display interface, to a second display context, appropriate for when the user moves away, such as across a room to a particular instrument, then back to the first display context when the user returns to a position close to the user interface. Such automatic switching can improve user efficiency.

The flexibility of the presently disclosed system and method enables a variety of context switching modalities. For example, a first user may wish to have quality control data displayed when he/she is proximate the user interface, then machine status information displayed when proximate the respective device, distant from the user interface, then the quality control data displayed again when he/she returns to the user interface. However, a second user may wish to have quality control data displayed when he/she is proximate the user interface, then machine status information displayed when proximate the respective device, then detailed device status information for all equipment in a laboratory when he/she returns to the user interface, in contrast to redisplay the quality control data as preferred by the first user. These examples illustrate the flexibility of the presently disclosed system and method.

In the embodiment of FIG. 5A, display 520 is recognized to be similar in content to that illustrated in FIG. 2 when a user is detected at a distance. However, the content is independently variable. In other words, the presently disclosed system and methods could provide for simultaneous alteration in both content and context, or could only adjust content and not context, or vice versa. Thus, system developers are provided with maximum flexibility in system response to user movement. Likewise, changes in user interface scope, discussed in conjunction with FIG. 4, can be made simultaneously with, or independently of, changes in display content and/or context.

Figure 5B:
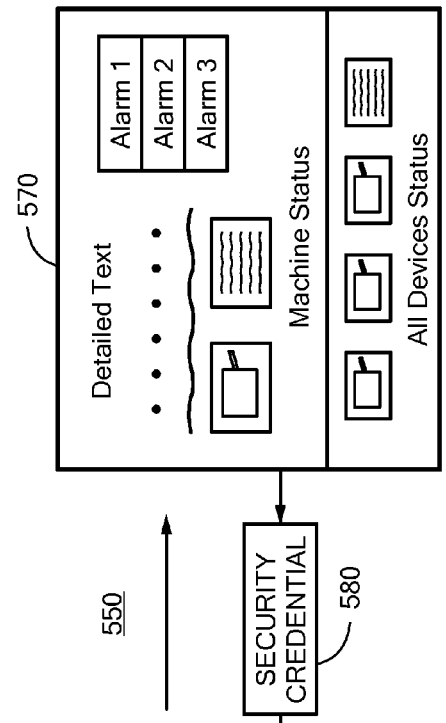
FIG. 5B is a diagram illustrating a transition between display data of one sensitive or restricted context and display data of another less sensitive or restricted context with respect to changing distance of a user from a user interface.

In FIG. 5B, an alternative display context modulation technique is illustrated. In general, the context change is akin to that illustrated in FIG. 5A: a user is provided with one display context when proximate the user interface and another display context when separated from the user interface by a detected distance. However, FIG. 5B illustrates a possible response when the user has been viewing sensitive or otherwise restricted information 560 at the user interface, such as test results for one or more identifiable patients. As the user is detected at or beyond a distance threshold according to any of the techniques described herein, the display context changes. In the illustrated embodiment of FIG. 5B, a display 570 of machine status is provided. It is noted that while a detailed display such as shown on the left side of FIG. 2 is reproduced in FIG. 5B, any display not comprising sensitive or otherwise restricted information may be provided as desired by a user or system developer.

In order to prevent an unauthorized user from gaining access to the previously displayed sensitive or otherwise restricted data, the embodiment of FIG. 5B requires a user to present one or more security credentials 580 in order to see that data. Once the proper credentials are presented, the initial display may be provided, or some other display may be provided, the choice being according to the needs of the application or desires of the system developer.

Security credentials and the authorization thereof may be according to any of various techniques, including requiring the entry of a password, biometric analysis, RF resonant card key or key fob, mechanical key, etc., or any combination thereof. Failure to provide the required security credential(s) may cause another non-sensitive or non-restricted display to be provided, no display to be provided, a password-requesting display to be provided, etc.

Figure 6:
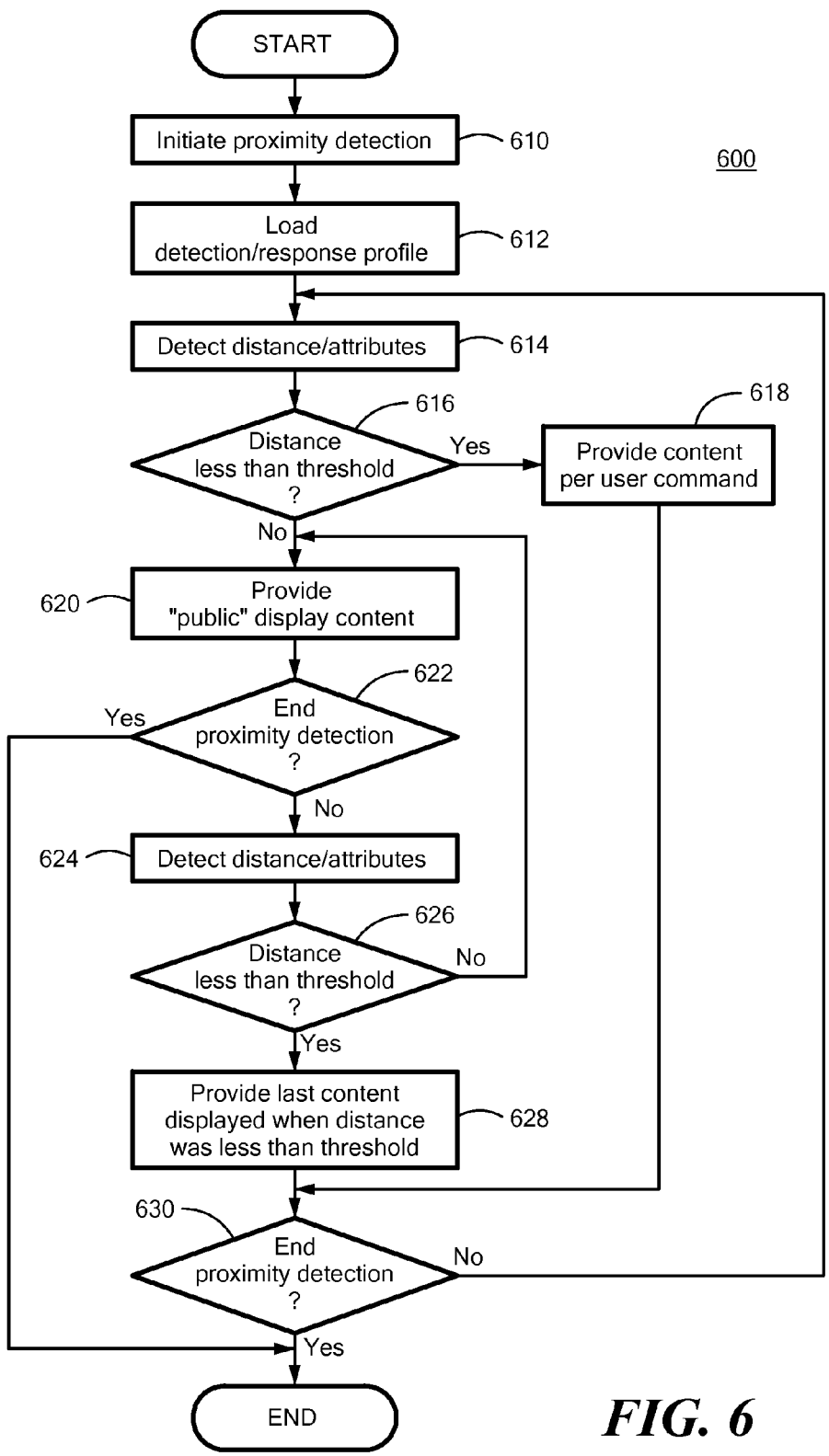
FIG. 6 is a flow chart illustrating a process for detecting distance of a user from a user interface and changing the context of information displayed to a user at the user interface with distance.

Referring now to FIG. 6, a flow chart 600 illustrates a first process for enabling display context modulation in response to detected user distance. The process begins with the initiation of proximity detection, as illustrated in block 610. The proximity detection can be turned on or off by the user or the system on which it is employed, and when turned on loads a detection/response profile stored in association with the console, as illustrated in a block 612. The detection/response profile can be configured for a particular user, a particular environment, or for use with a particular distance detection device or sensor. The profile can also be used to configure the display context in response to various detected distances or ranges of distances between a user and a user interface. Display context, as used here, refers to a classification of display content. For example, an authorized user may be presented with one or more displays classified as comprising sensitive or otherwise restricted information when that user is detected at close range to a display device associated with a user interface. However, when the user is at or beyond a specified distance from the display device, the display context changes to provide non-sensitive or non-restricted display data. Any type of context modulation in relation to detected distance can be implemented in the profile, which is loaded once the proximity detection process is active.

As the proximity detection process becomes active, distance/attributes of a user with respect to a user interface is detected, as illustrated in a block 614. The distance/attributes detected can be in accordance with the above described sensing techniques, including face detection and motion detection.

A determination of whether the user is located at or proximate the user interface can be made, as illustrated with decision block 616. If the detected distance is less than a specified threshold, indicating that the user is located at or proximate the user interface, the set of display contexts available for display to the user includes sensitive or restricted information. As long as the user is authorized to view such information, which may optionally be established through the required provision of one or more security credentials, the requested content is provided on the display, as illustrated with the "yes" branch taken from decision block 616 to block 618. If it is determined that the user distance is greater than a threshold distance value, indicating the user is not located at or proximate the user interface, further processing can be undertaken, as indicated with the "no" branch from decision block 616.

As part of the further processing, the detected distance/attributes can be applied to the detection/response profile. In the illustrated example, the detection/response profile requires the display of only "public," or non-sensitive or non-restricted information, when the user is detected as being remote from the user interface, as illustrated in block 620.

A determination is made as to whether proximity detection should be terminated, as illustrated in decision block 622. If proximity detection is not commanded to end, the process illustrated in flowchart 600 continues with the detection of distance, distance range, and/or attributes, as illustrated with the "no" branch of decision block 622 leading to block 624. If proximity detection is to be terminated, the process illustrated in flowchart 600 ends as illustrated with the "yes" branch of decision block 622.

In block 624, distance/attributes of a user with respect to a user interface is again detected. If the user is (still) located at a location or within a range of locations greater than a given threshold, no change is made to the display context. In the present example, this means no sensitive or restricted information is displayed, though various other non-secure information can be displayed, as desired by a user and by a system developer. The process follows the "no" branch from decision block 626 and returns to block 620.

If, however, the user is detected at a distance or range of distances less than a given threshold value, the display content or context provided when the user was last proximate the user interface may be again displayed, as shown following the "yes" branch from decision block 626 and in block 628. A determination is again made as to whether proximity detection should be terminated, as illustrated in decision block 630. If proximity detection is not commanded to end, the process illustrated in flowchart 600 continues with the detection of distance, distance range, and/or attributes, as illustrated with the "no" branch of decision block 630 leading to block 614. If proximity detection is to be terminated, the process illustrated in flowchart 600 ends as illustrated with the "yes" branch of decision block 630.

Figure 7:
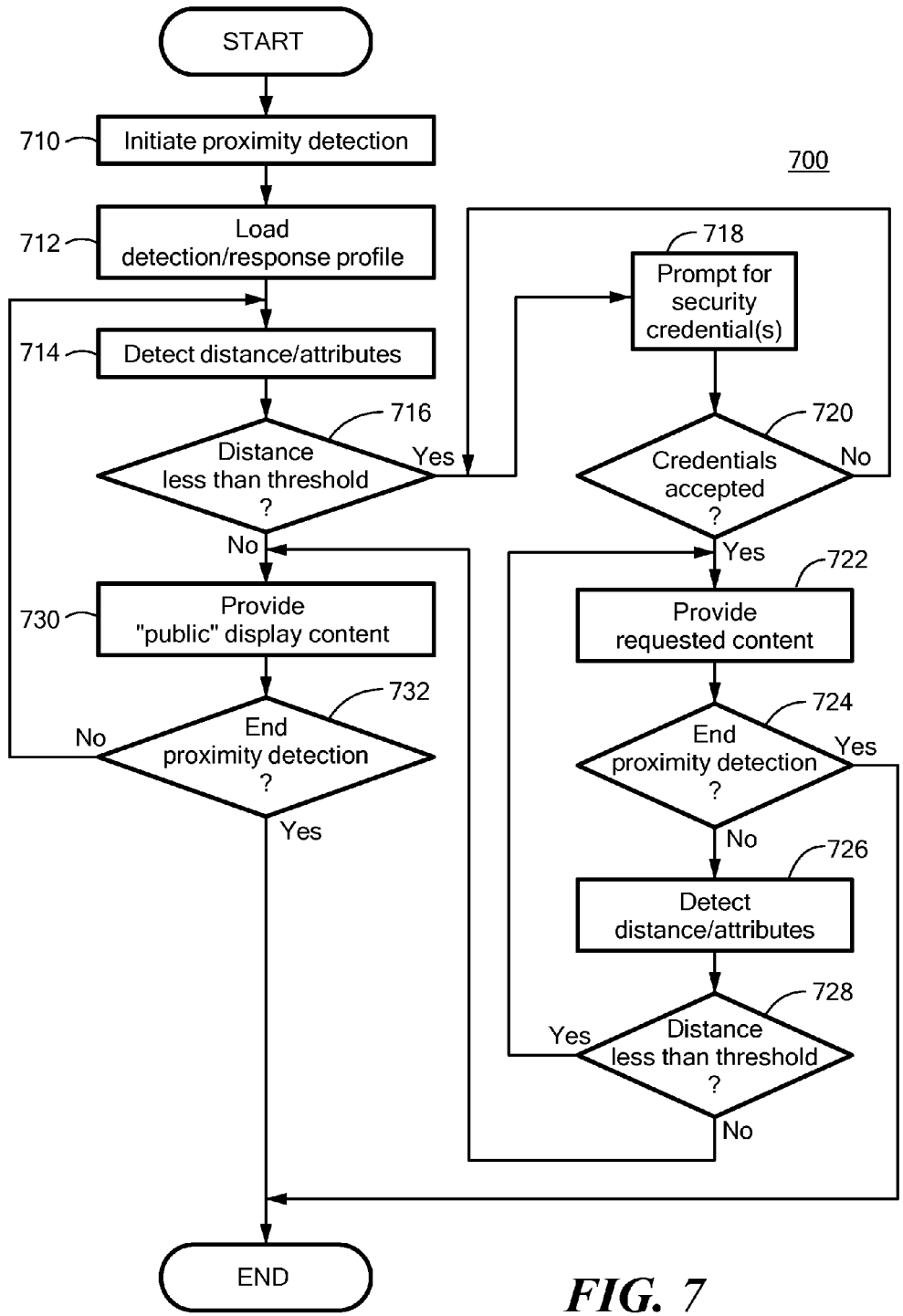
FIG. 7 is another flow chart illustrating a process for detecting distance of a user from a user interface and changing the context of information displayed to a user at the user interface with distance.

The flow chart 700 of FIG. 7 also reflects an ability to adjust display context with user distance or presence, but also illustrates an ability to prevent unauthorized access to sensitive or otherwise restricted information. The illustrated process begins with the initiation of proximity detection, as illustrated in block 710. The proximity detection can be turned on or off by the user or the system on which it is employed, and when turned on loads a detection/response profile stored in association with the console, as illustrated in a block 712. The detection/response profile can be configured for a particular user, a particular environment, or for use with a particular distance detection device or sensor. The profile can also be used to configure the display context in response to various detected distances or ranges of distances between a user and a user interface. Display context, as used here, refers to a classification of display content. For example, an authorized user may be presented with one or more displays classified as comprising sensitive or otherwise restricted information when that user is detected at close range to a display device associated with a user interface. However, when the user is at or beyond a specified distance from the display device, the display context changes to provide non-sensitive or non-restricted display data. Any type of context modulation in relation to detected distance can be implemented in the profile, which is loaded once the proximity detection process is active. However, in the process of FIG. 7, a user must present security credentials in order to view display context including sensitive or restricted information.

As the proximity detection process becomes active, distance/attributes of a user with respect to a user interface is detected, as illustrated in a block 714. The distance/attributes detected can be in accordance with the above described sensing techniques, including face detection and motion detection.

A determination of whether the user is located at or proximate the user interface is made, as illustrated with decision block 716. If the detected distance is less than a specified threshold, indicating that the user is located at or proximate the user interface, the user is prompted for one or more security credentials, as illustrated by following the "yes" branch from decision block 716 to block 718. As described herein, security credentials can include the provision of a password via keyboard or keypad, biometric analysis, presentation of an RF resonant or mechanical key, etc.

If the security credential or credentials are accepted, the user is either provided with a default display or is given the opportunity to request specific content, as shown by following the "yes" path from decision block 720 to block 722. If the credential or credentials are not accepted, the user is again prompted to provide them, as shown by following the "no" branch from decision block 720 back to block 718. This is but one example of a response to failed credential acceptance. Alternatively, the display context may revert to public or otherwise non-restricted information, requiring the user to command the user interface to again analyze security credentials, such as by using a mouse or other pointing device to click a "Log-In" icon on a display screen.

After the requested content is displayed, the illustrated embodiment includes a periodic check as to whether proximity detection should be terminated, as illustrated in decision block 724. If proximity detection is to continue, the distance/attributes of a user with respect to the user interface is again detected, as illustrated by following the "no" branch from decision block 724 to block 726. Whether the user is at a distance or range of distances less than a given distance threshold is again tested, as shown in decision block 728. If the user is detected at a distance below this threshold, requested content continues to be displayed, as illustrated by following the "yes" branch from decision block 728 to block 722. Otherwise, if the user is detected at a distance or range of distances greater than the threshold, or if the user is not detected at all, the display context is restricted to information that is classified as not sensitive or otherwise restricted, as shown by following the "no" branch from decision block 728 to block 730. Whether proximity detection should end is again tested at decision block 732. If so, the process ends, as shown by following the "yes" branch from decision block 732. Otherwise, the process returns to detecting the user distance/attributes, as shown by following the "no" branch from decision block 732 to block 714.

Returning to decision block 716, if the user is initially detected at a distance or range of distances greater than the given threshold value, the display context is restricted to public or otherwise non-secure display information, as shown by following the "no" branch from decision block 716 to block 730.

It is apparent that, in the embodiment illustrated in FIG. 7, if a user has provided the required credentials in order to view secure information while proximate the user interface, then moves beyond a given threshold distance, the user must once again provide the security credentials in order to view the secure information again.

The presently described proximity aware user interface permits a number of advantages to be obtained in addition to the ones described above. For example, a user interface output can be automated based on the sensing of the presence of a generally identified individual, or a particular user. The display can be used to attract a user or individual that may be located some distance from the user interface. For example, when the proximity detection does not detect an individual, or detects a significant distance between the individual and the user interface, the user interface can increase the promotion and/or urgency of outputs to call an individual or user into closer proximity with the user interface.

Some of the changes that can be made to the user interface based on user proximity include activation of the proximity awareness, which can be implemented through user interface input, which may be provided as a monitored software thread to cause an event to be displayed. At a distance, a user can provide gesture-type input to the user interface to provide commands or feedback to the user interface. Such gesture-type input would otherwise be disabled if the user is proximate the user interface as a result of an automatic change in the scope of user interface interaction. The user interface can be changed by modifying pixel granularity, resolution, the size or location of items, as well as providing a scrolling action for displaying a number of items that are potentially larger than a viewing space of a display, for example. Accordingly, if the user is at a particular distance from the user interface, the user interface may begin to scroll various items across the screen to permit the user to observe a status of a number of different components at a distance from the user interface.

Security can also be provided in accordance with the present disclosure by causing a screen to be disabled or locked out if the presence of a user goes undetected for a certain period of time. The context of displayed information can also change with user distance or presence, such that information including sensitive information is secured in the absence of a proximate user having appropriate security credentials. A user interface output may also be turned off to avoid outputting sensitive material upon the detection of another individual in the environment or in near or far proximity to the user interface.

Although the present disclosure describes a target device as generally being a computing device, the disclosed systems and methods can be generally implemented with target devices, systems or methods that may not always be thought of in terms of computing devices. Examples of such targets that may employ the presently disclosed systems and/or methods include televisions, mobile phones, automotive vehicles, medical instrumentation, as well as typical targets for software updates such as database applications or embedded systems. In general, the disclosed systems or methods may be applied with any type of processing system that executes software.

The operations herein described are purely exemplary and imply no particular order. Further, the operations can be used in any sequence when appropriate and can be partially used. With the above embodiments in mind, it should be understood that the disclosed systems, devices, methods and/or uses can employ various computer-implemented operations involving data transferred or stored in computer systems. These operations are those requiring physical manipulation of physical quantities. Usually, though not necessarily, these quantities take the form of electrical, magnetic, or optical signals capable of being stored, transferred, combined, compared, and otherwise manipulated.

Any of the operations described herein that form part of the present disclosure are useful machine operations. The present disclosure also relates to a device or an apparatus for performing these operations. The apparatus can be specially constructed for the required purpose, or the apparatus can be a general-purpose computer selectively activated or configured by a computer program stored in the computer. In particular, various general-purpose machines employing one or more processors coupled to one or more computer readable medium, described below, can be used with computer programs written in accordance with the teachings herein, or it may be more convenient to construct a more specialized apparatus to perform the required operations.

The disclosed system and method can also be embodied as computer readable code on a computer readable medium. The computer readable medium is any data storage device that can store data, which can thereafter be read by a computer system. Examples of the computer readable medium include hard drives, read-only memory, random-access memory, CD-ROMs, CD-Rs, CD-RWs, magnetic tapes and other optical and non-optical data storage devices. The computer readable medium can also be distributed over a network-coupled computer system so that the computer readable code is stored and executed in a distributed fashion.

The foregoing description has been directed to particular embodiments of the present disclosure. It will be apparent, however, that other variations and modifications may be made to the described embodiments, with the attainment of some or all of their advantages. The procedures, processes and/or modules described herein may be implemented in hardware, software, embodied as a computer-readable medium having program instructions, firmware, or a combination thereof. For example, the functions described herein may be performed by a processor executing program instructions out of a memory or other storage device. Therefore, it is the object of the appended claims to cover all such variations and modifications as come within the true spirit and scope of the present disclosure.

What is claimed is:

1. A system for managing a user interface based on user distance, comprising:
 a distance measurement unit for detecting a distance of a user from the user interface;
 a controller, communicatively coupled to the distance measurement unit, for receiving an input of a distance measurement from the distance measurement unit;
 a memory, accessible by the controller, for storing data correlating input from the distance measurement unit indicative of the distance of a user from the user interface with control signal modulation data; and
 a presentation device communicatively coupled to the controller for receiving control signals therefrom to cause the presentation device to present information in accordance with the control signals;
 the controller being responsive to the control signal modulation data to modulate the control signals to at least one of
  cause the presentation device to modify the information content presented by the presentation device, and
  selectively change the context of the information presented by the presentation device.

2. The system according to claim 1, wherein the distance measurement unit comprises an optical image capture device.

3. The system according to claim 2, wherein the distance measurement unit further comprises a face detection engine for detecting a face in an image captured by the optical image capture device and the distance measurement unit is operative to generate the input based on a determination of a size of a detected face in the image captured by the optical image capture device.

4. The system according to claim 2, further comprising a motion detection engine for detecting motion based on images captured by the optical image capture device and for providing a signal in response thereto, the controller being configured to enable or disable presentations on the presentation device in response to the motion detection engine signal.

5. The system according to claim 1, wherein the data correlating input from the distance measurement unit with control signal modulation data stored in the memory includes at least one threshold distance.

6. The system according to claim 5, further comprising:
 the controller being configured, when the distance measurement input is greater than the at least one threshold distance, to at least one of increase a dimension of elements presented by the presentation device and decrease the number of elements presented by the presentation device; and
 the controller being configured, when the distance measurement input is less than the at least one threshold distance, to at least one of decrease a dimension of the elements of the presentation and increase the number of elements presented by the presentation device.

7. The system according to claim 1, wherein the controller is responsive to the control signal modulation data to modulate the control signals to selectively change the context of the information presented by the presentation device from restricted information to one of no information, information requiring entry of one or more security credentials, and non-restricted information.

8. The system according to claim 1, wherein the controller is responsive to the control signal modulation data to modulate the control signals to selectively change the context of the information presented by the presentation device from non-restricted information to restricted information.

9. The system of claim 8, wherein the controller is configured to selectively change the context of the information presented by the presentation device from non-restricted information to restricted information only after having issued control signals to the presentation device to prompt a user to present at least one security credential and after having confirmed the authenticity of at least one security credential provided by the user.

10. The system of claim 1, the controller further comprising at least one user input device for enabling a user to provide user input to the controller, wherein the controller is further responsive to the control signal modulation data to control signals to selectively enable the at least one user input devices.

11. The system of claim 10, wherein the at least one user input device is selected from the group consisting of a keyboard, a mouse, a touch screen display, a microphone and associated voice command software, and an optical sensor and motion recognition software.

12. A computer implemented method for managing a user interface based on user distance, the user interface comprising a distance measurement unit for detecting a distance of a user from the user interface and providing a distance signal in response thereto, a controller communicatively coupled to the distance measurement unit to receive the distance signal and to provide control signals in response thereto, a memory communicatively coupled to the controller for storing data correlating the distance signal with control signal modulation data, and a presentation device communicatively coupled to the controller to receive the control signals therefrom to cause the presentation device to present information in accordance with the control signals as modulated by the control signal modulating data, the computer implemented method comprising:
 detecting a distance of a user from the user interface with the distance measurement unit and generating the distance signal in response thereto;
 receiving the distance signal at the controller;
 correlating, by the controller, the distance signal with control signal modulation data in the memory; and
 controlling the presentation device, via control signals from the controller modulated by the control signal modulation data, to at least one of
  cause the presentation device to present information content that corresponds to the distance signal, and
  selectively change the context of the information presented by the presentation device.

13. The method according to claim 12, wherein the step of detecting the distance further comprises detecting the distance with an optical image capture device.

14. The method according to claim 13, wherein the step of detecting the distance further comprises detecting a face in an image captured by the optical image capture device and determining a size of a detected face in the image captured by the optical image capture device.

15. The method according to claim 12, further comprising detecting motion based on images captured by the distance measurement unit and providing a signal to the controller in response thereto, the controller enabling or disabling presentations on the presentation device in response to the motion detection signal.

16. The method according to claim 12, wherein the step of correlating further comprises comparing the distance signal with at least one distance threshold stored in the memory and controlling the presentation device based on the result of the comparison.

17. The method according to claim 16, further comprising:
   the controller at least one of increasing a dimension of elements of the information and decreasing a number of elements in the information when the detected distance is greater than the at least one threshold; and
   the controller at least one of decreasing a dimension of the elements of the information and increasing the number of elements in the information when the detected distance is less than the at least one threshold.

18. The method according to claim 12, further comprising:
   modulating the control signals, by the controller in response to the control signal modulation data, to selectively change the context of the information presented by the presentation device from restricted information to one of no information, information requiring entry of one or more security credentials, and non-restricted information.

19. The method according to claim 12, further comprising:
   modulating the control signals, by the controller in response to the control signal modulation data, to selectively change the context of the information presented by the presentation device from non-restricted information to restricted information.

20. The method according to claim 12, further comprising:
   modulating the control signals, by the controller in response to the control signal modulation data, to selectively change the context of the information presented by the presentation device from non-restricted information to restricted information only after issuing control signals to the presentation device to prompt a user to present at least one security credential and after confirming the authenticity of the at least one security credential provided by the user.

21. The method according to claim 12, further comprising:
   detecting user activity or inactivity based upon input from the distance measurement unit; and
   enabling or disabling information presentation on the presentation device in response to detecting the user activity or inactivity.

22. The method according to claim 12, wherein the user interface further comprises at least one user input device for receiving user input, and wherein the method further comprises selectively enabling the at least one user input device in response to control signals generated by the controller and modulated by the control signal modulation data.

23. The method according to claim 22, wherein the at least one user input device is selected from the group consisting of a keyboard, a mouse, a touch screen display, a microphone, and associated voice command software, and an optical sensor and motion recognition software.

24. The method according to claim 22, further comprising:
   detecting user activity or inactivity based upon input from the at least one user input device; and
   enabling or disabling information presentation on the presentation device in response to detecting the user activity or inactivity.

* * * * *